Dec. 26, 1950 W. ERNST ET AL 2,535,054
BRUSH PULLER
Filed April 30, 1947 5 Sheets-Sheet 2
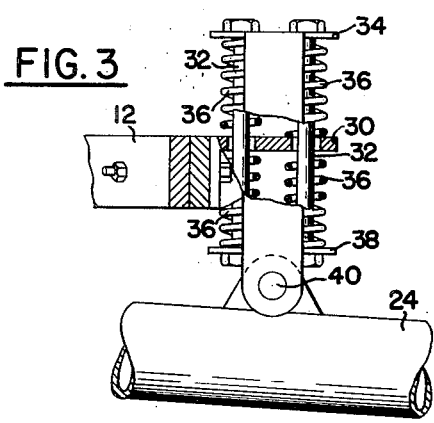
FIG. 3
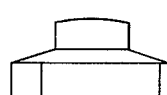
FIG. 5
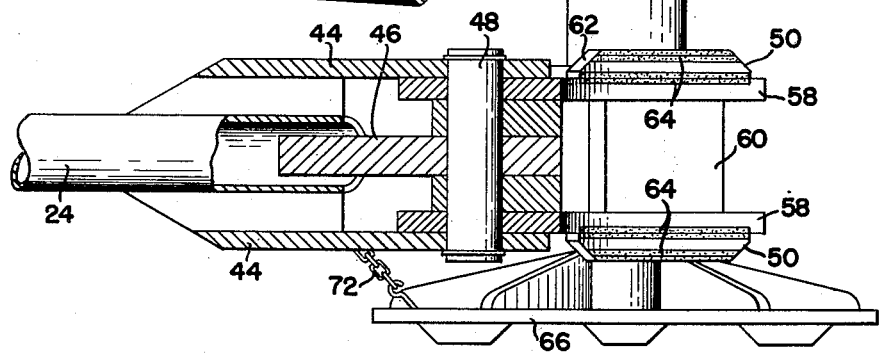
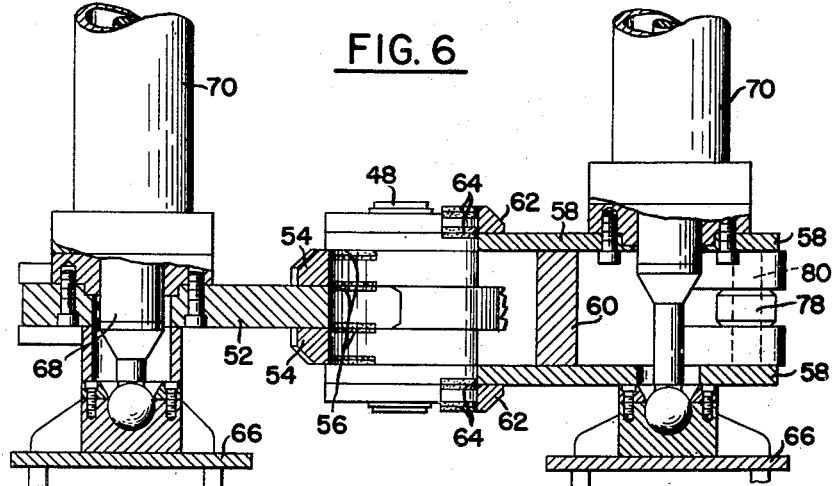
FIG. 6
INVENTOR
WALTER ERNST,
BY DICK F. BOYD
Toulmin & Toulmin
ATTORNEYS

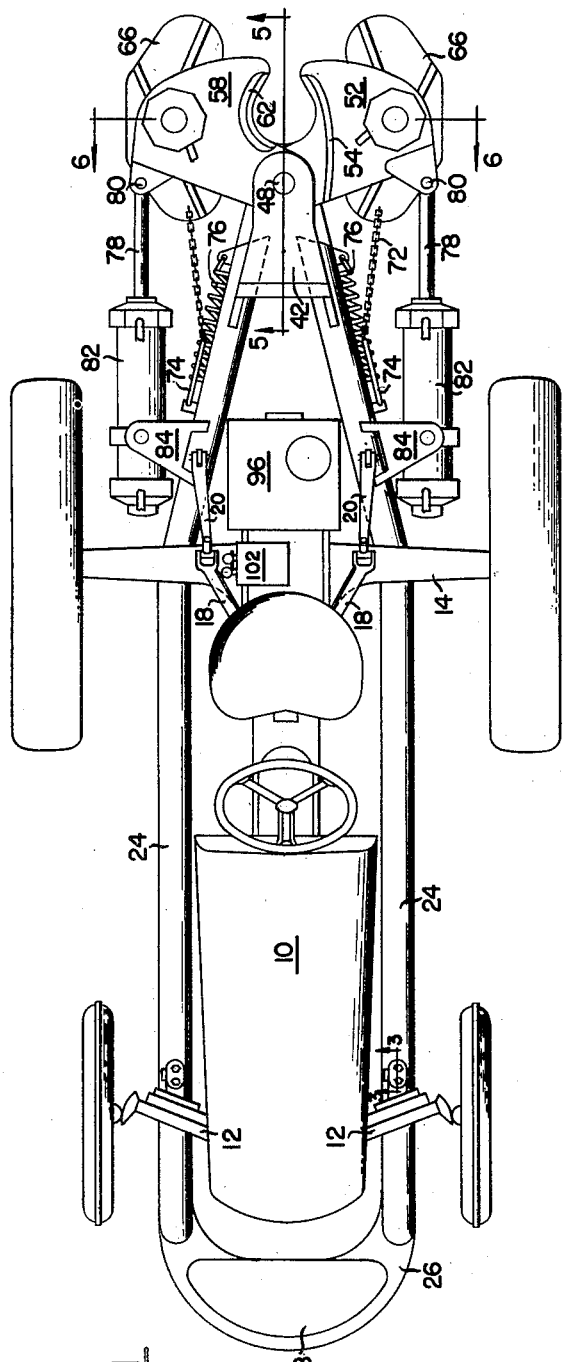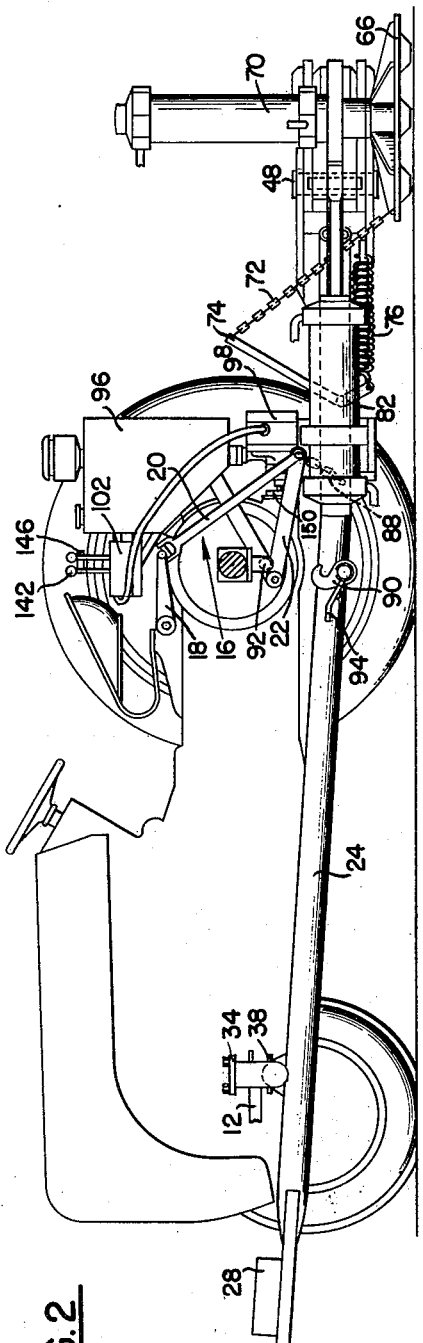

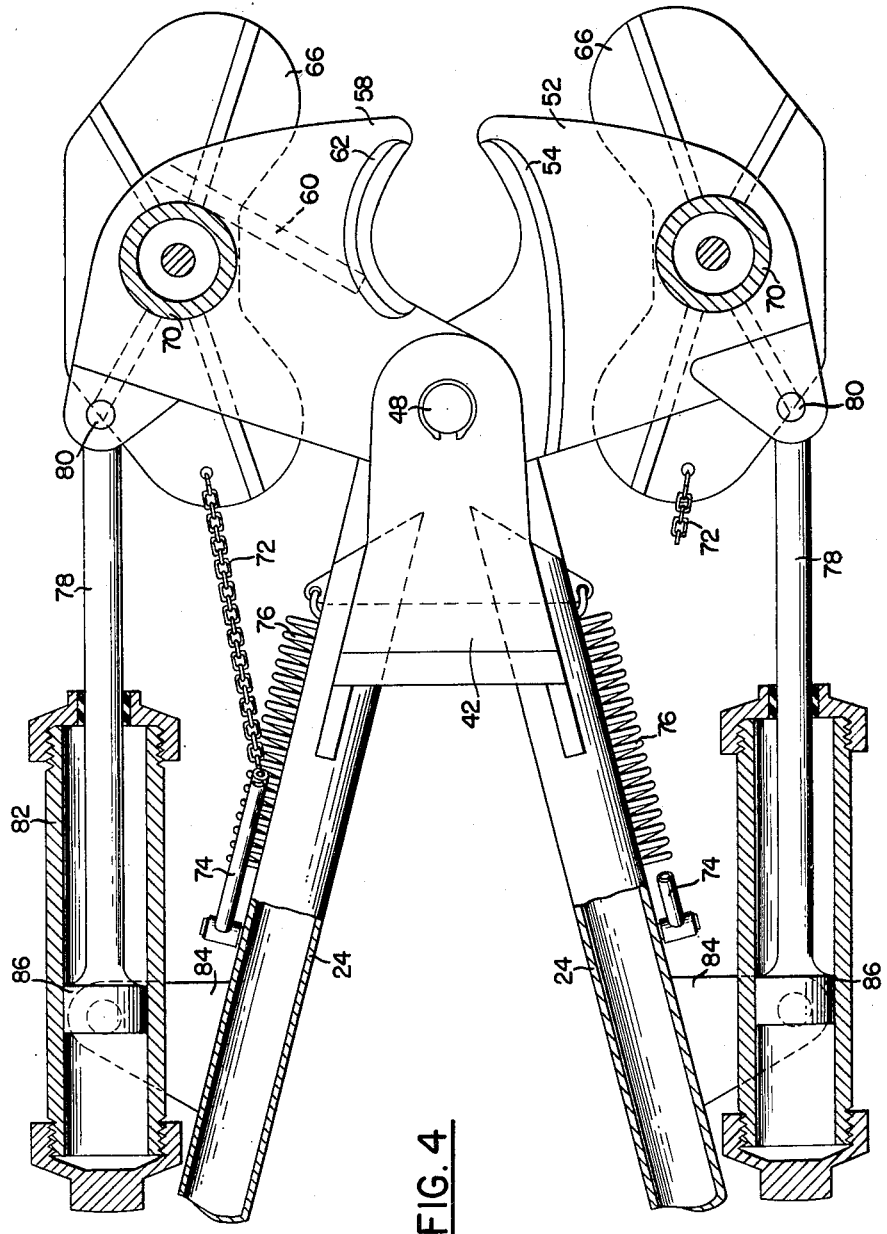

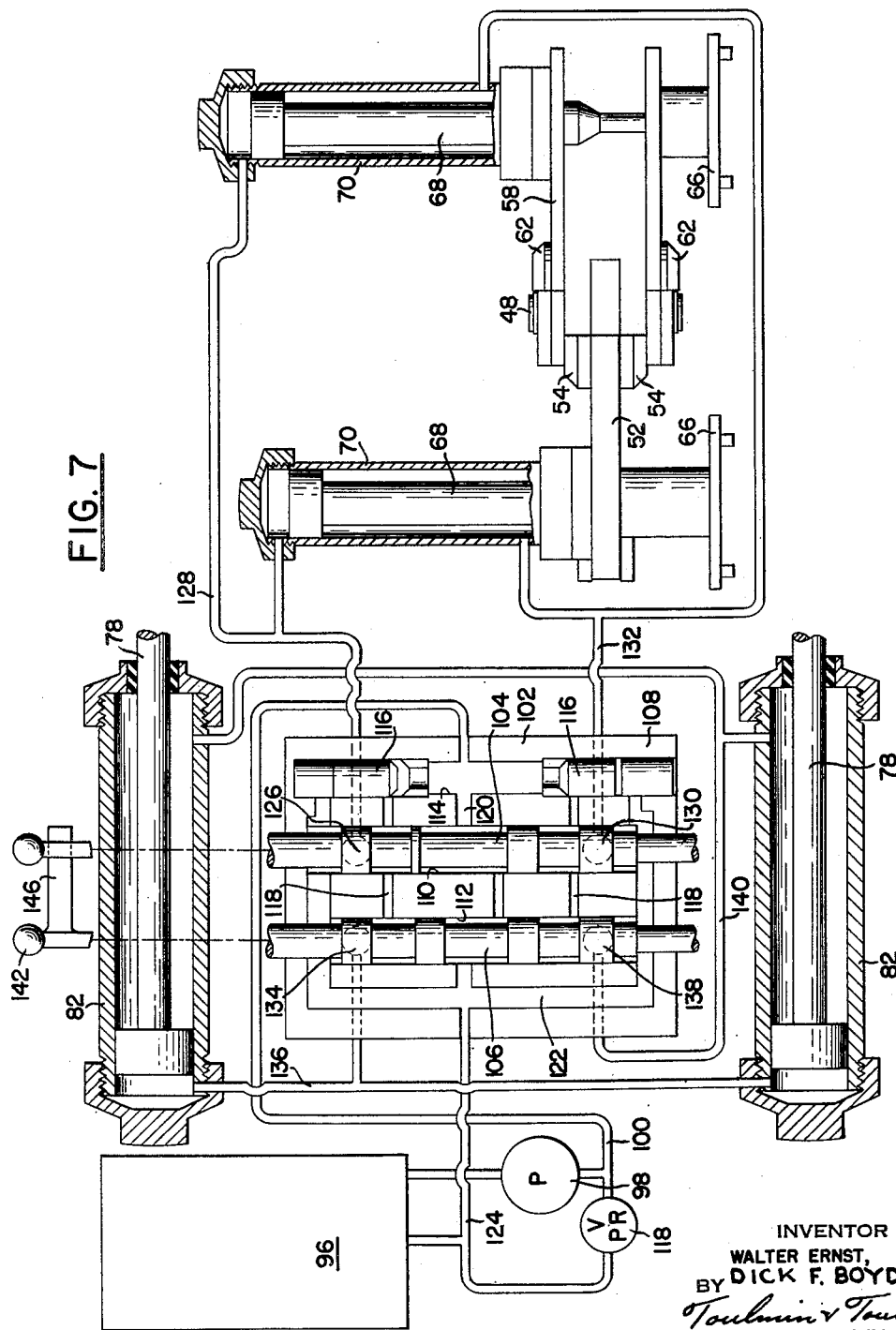

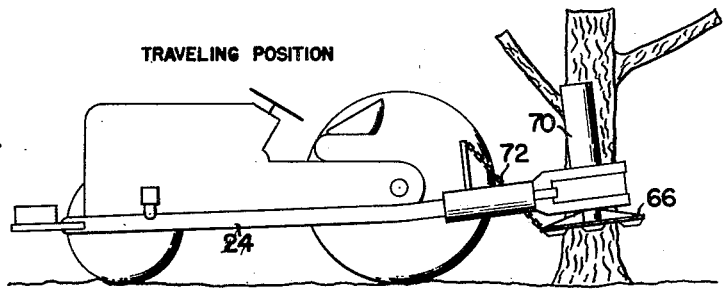
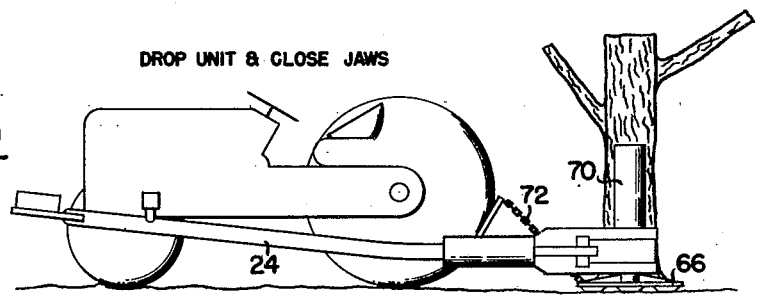
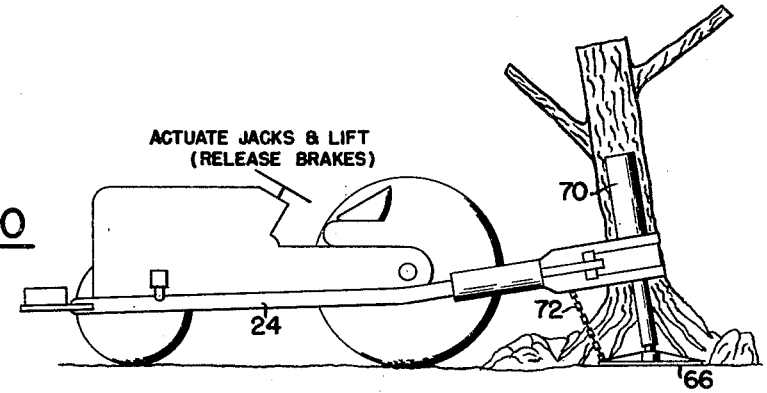
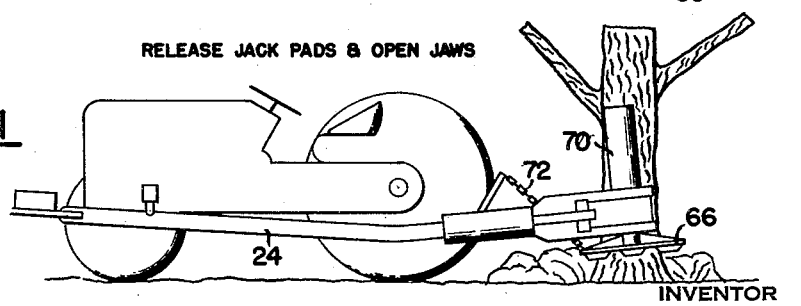

Patented Dec. 26, 1950

2,535,054

UNITED STATES PATENT OFFICE 2,535,054

BRUSH PULLER

Walter Ernst, Mount Gilead, and Dick Franklin Boyd, Dayton, Ohio, assignors to Institute of Industrial Research, San Antonio, Tex., a foundation of Texas Application April 30, 1947, Serial No. 744,900

20 Claims. (Cl. 254—132)

This invention relates to an apparatus for pulling tree stumps, bushes and brush from ground in order to permit their easy removal, and particularly this invention relates to such a device which is adapted for being secured to a mobile unit such as a tractor and which includes its own power unit.

The particular object of this invention is to provide an improved apparatus for pulling tree stumps and the like.

Another object of this invention is to provide a stump or brush pulling unit adapted for being mounted on a standard tractor.

It is also an object of this invention to provide a stump or brush pulling unit which is light, simple to construct, exceedingly strong in operation.

A still further object of this invention is to provide a stump or brush pulling unit for attachment to a tractor which is hydraulically actuated.

Still another object of this invention is to provide a hydraulically actuated stump or brush pulling unit adapted for being secured to a tractor and which includes its own hydraulic power generator which may be connected with the power take off of the tractor.

These and other objects and advantages will become more apparent upon reference to the following description taken in connection with the accompanying drawings in which:

Figure 1 is a plan view of a tractor having a stump or brush pulling unit according to this invention mounted thereon;

Figure 2 is a side view of the assembly shown in Figure 1;

Figure 3 is a sectional view indicated by the line 3—3 on Figure 1 and showing the resilient support for the frame of the unit at the forward end of the tractor;

Figure 4 is a plan view taken over the rear end of the unit shown in Figures 1 and 2;

Figure 5 is a vertical section indicated by the line 5—5 on Figure 1 and showing details of construction in connection with the gripping jaws of the unit;

Figure 6 is a vertical section indicated by the line 6—6 on Figure 1 and showing other details in connection with the gripping jaws and the lifting jacks associated with the jaws;

Figure 7 is a diagrammatic view of the hydraulic actuating circuit for the jaw clamping motors and the lifting jacks; and Figure 8 through 11 are diagrammatic views showing the operators in different stages during a stump pulling operation.

General arrangement

The brush pulling unit according to this invention generally comprises a frame work, preferably of tubing, which is adapted for being mounted on the frame of a standard tractor. The unit is pivotally supported on the tractor so that the rear end thereof may be lifted and lowered and at the said rear end there are provided a pair of clamping jaws.

The aforementioned clamping jaws consist of a pair of telescoping members which are hydraulically actuated for clamping therebetween bushes, brush, tree stumps and trees up to a predetermined maximum size.

Also mounted at the rear end of the unit are a pair of spaced lifting jacks which are energized when the jaws are clamped for forcing the rear end of the unit upwardly thereby to dislodge from the ground the brush or tree clamped by the said jaws.

The unit is adapted for being connected with the usual implement lifting mechanism associated with the standard tractor and includes carrying means whereby the unit may be lifted from the ground and rigidly supported on the tractor frame for transportation.

The aforementioned hydraulic motors for the jaws and the lifting jacks are supplied with pressure fluid from a pump connected with the power takeoff of the tractor. This pump delivers through a valve unit to the said motors and the valve unit is operable by the tractor operator for actuating the jaws and lifting jacks. Preferably, the valve units for the separate parts of motors are mechanically interlocked to prevent the releasing of the jaws of the unit while the lifting jacks are energized. This interlock prevents damage to the reciprocating rams of the jacks which might occur if they were to remain energized when the jaws were unclamped.

Structural arrangement

Referring more particularly to the drawings, in Figures 1 and 2, there is illustrated a tractor 10 which includes the front axle means 12 and rear axle means 14. Adjacent the rear axle means the tractor is provided with an instrument lifting mechanism generally indicated at 16 and which includes the power driven arm 18 which pivots counterclockwise, as viewed in Figure 2, to move the link 20 thereby to pivot the arm 22 also in a counterclockwise direction as viewed in Figure 2. This instrument lift is substantially conventional and it will be understood that other lifting devices could be employed if desired.

The unit of this invention comprises a frame having the tubular side rails 24 extending down each side of the tractor 10. At the forward end of the tractor the members 24 are connected by a plate 26 which carries a counterweight 28 the purpose of which is to partially counterbalance the mechanism at the rear end of the unit and to assist in distributing the weight of the unit over the tractor frame. The unit is pivotally supported on the tractor by a suspension assembly carried between the said unit and the front axle 12 of the tractor. This suspension unit consists of a bracket 30 mounted on the tractor axle and through which extends a pair of bolts 32. The bolts receive beneath their ends a pair of plates 34 and between the said plates and the bracket 30 there bear the compression springs 36. Extending downwardly and interconnecting the plates 34 are another pair of plates 38 which form at their lower end a means for receiving the pivot pin 40 which is also connected with the frame of the unit. This assembly pivotally supports the unit on the tractor but cushions the weight of the said unit in both up and down loads on the tractor frame.

The tubular members 24 extend rearwardly and are bent toward each other and have their rear ends interconnected by a welded clevis structure 42 which is best seen in Figures 4, 5 and 6. This structure consists of upper and lower members 44 and an intermediate member 46 all of which are secured to the tubular members 24 by welding and which are suitably braced together to form an integral unit.

The plates 44 and 46 extend rearwardly and are apertured on a vertical axis to receive a pivot pin 48 between the plates 44 and 46 and also mounted on the pin 48 there are a pair of jaw structures generally indicated at 50.

The jaw structures, best seen in Figures 4, 5 and 6 consist of telescoping members, the left hand one of which as viewed in Figure 6 comprises a heavy plate 52 having welded or otherwise suitably secured, to the upper and lower surfaces thereof the smaller plates 54. Preferably the plates 54 are secured by welding and in addition to the bead formed by the welding at the juncture of the plates, there are provided additional beads at the top and bottom of the finished jaws. These beads are indicated at 56 and serve to increase the gripping power of the jaw.

The right hand jaw as viewed in Figure 6, consists of a pair of spaced plates 58 adapted for receiving therebetween the assembled left hand jaw unit. Plates 58 are secured together by the brace 60 extending therebetween and also have secured to their upper and lower faces the smaller plates 62 which increases the working area of the jaw face similarly as the plates 54 increase the working surface of the left hand jaw. The right hand jaw is likewise preferably provided with the beading indicated at 64 for augmenting the gripping action of the jaw. It will be apparent that the jaws are arranged to telescope and thus they will grip any member from the smallest up to a predetermined maximum size with equal facility.

Carried on each of the aforementioned jaws is a jack pad 66 which is for the purpose of forcing the jaws upwardly when clamped around an article it is desired to pull from the ground. Each of the plates 66 is kidney shaped as best seen in Figures 1 and 4 in order to permit the maximum open area therebetween to permit the roots of the shrub or tree being pulled to come from the ground. Each of the jack pads is connected by a ball and socket joint with the lower end of a ram 68 that extends upwardly in a cylinder 70 carried by the associated jaw member.

In order properly to position the jack pads there is preferably connected with each thereof a chain 72 which leads to a lever 74 pivoted to the frame of the unit and spring urged by spring 76 to exert tension on the said chain. This normally retains the jack pads in their proper position but permits movement thereof under force to permit proper operation of the device.

For actuating the jaw members 50 each has connected therewith the ram 78. The connection of the ram 78 with its respective jaw 50 is by means of a pivot 80 to permit relative rotation therebetween. Each of the rams 78 extend into the cylinder 82 which is pivotally supported on the frame of the unit as by means of the plates 84 rigidly secured to the member 24 as by welding. The pivot means at 86 support the cylinder 82 on plates 84 and permit pivoting movements of the cylinder when the jaw is actuated.

As best seen in Figures 1 and 2 the unit is adapted for connection with the tractor implement lift by means of the short lengths of chains shown at 88. These chains have one end connected with the members 24 and their other ends connected with the ends of the arms 22 of the tractor implement lift. It is preferred to support the unit rigidly for the purpose of transportation by means of the hook 90 pivoted on the member 24 and the bar 92 carried on the rear axle structure of the tractor. Normally, the hook 90 engages the bar 92 but may be released therefrom by the pedal 94 in order to permit lowering of the unit for use.

The hydraulic circuit for operating the jack and jaw motors is illustrated in Figure 7. In this view there is a reservoir 96 and connected to draw fluid therefrom is a pump 98 having a discharge conduit 100. The discharge conduit 100 is connected with the inlet of a multiple valve 102 which includes a first valve member 104 for controlling the supply of fluid to the jack rams 68, and a second valve member 106 for controlling the supply of fluid to the jaw rams 78.

The valve 102 consists of a body 108 and therein are the bores 110 for receiving the valve member 104, the bore 112 for receiving the valve member 106 and the bore 114 which communicates with the conduit 100. In each end of the bore 114 is a check valve unit 116 each of which will open to communicate the bore 114 with one of the passages 118 which extend through the valve body and interconnect the bores 110, 112 and 114. There is also a passage 120 extending from the bore 114 through the bores 110 and 112 and making connection with the exhaust passage 122 in the valve body which connects by the conduit 124 with the reservoir 96.

The bore 110 has therein a port 126 which is connected by a conduit 128 with the upper ends of the cylinder 70 for supplying fluid thereto to move the jack rams 68 downwardly. The bore 110 also has a port 130 which is connected by the conduit 132 with the lower ends of the cylinder 70 to supply pressure fluid thereto for driving the jack rams upwardly.

Similarly, the bore 112 has a port 134 connected by a conduit 136 with the left ends of the cylinder 82 for supplying fluid thereto to drive the jaw rams 78 in a direction to close the jaws 50 and a port 138 connected by a conduit 140 with the other ends of the cylinders of the two jaw rams.

The valve member 106 for controlling the movements of the jaw actuating rams has connected therewith a manually operated level 142 and similarly connected with the valve member 104 is the operating member 144. A plate or arm 146 is carried by the lever 142 and overlies the lever 144 thereby mechanically interlocking their operation in at least one direction of movement of each. As shown in Figure 7, the lever 142 may be moved into position to close the jaws without effecting the position of the lever 144. However, if both the levers 142 and 144 are in their upper positions, as viewed in Figure 7, movement of the lever 142 to open the jaws will be accompanied by movement of the lever 144 to lift the jack pads. This arrangement is important in preventing damage to the jack rams 68.

Operation

In operation, the unit is transported to the position it is intended to be used with the hook 90 engaged with the bar 92. Normally, the jack pads are lifted and the jaws are open. During this time, the valve members 104 and 106 may be positioned to direct a supply of fluid from the pump 98 to the retracting sides of the ram 68 and 78 or, the rams may be moved to their retracted position and thereafter both of the valve members 104 and 106 moved to a center position wherein they close off all of the ports connected with the ram cylinders and simultaneously connect the pump to discharge to exhaust. In the second case the pump bypasses freely to the reservoir while in the first case the pump will discharge through the relief valve 148 to the reservoir.

When it is desired to use the unit, the unit is raised with the tractor implement lift far enough to permit disengagement of the latch 90. The unit is then lowered by the tractor implement lift until the jack pads are just clearing the ground. Thereafter, the unit is positioned with the open jaws enclosing the bush or tree to be pulled from the ground by movement of the tractor. The jaws are then closed by shifting the valve member 106 by the lever 142. After the jaws have clamped around the article to be pulled from the ground, the valve 104 is actuated by moving the lever 144 in the same direction that the lever 142 had been moved. This will energize the jack rams 68 and force the jack pads 66 downwardly against the ground. During actuation of the jack pads, the implement lift is preferably actuated so that it will rise with the unit and the tractor brakes are released to permit it to move if necessary due to the action of the jacks.

After the jack rams have become extended to the limit of their movement or when a sufficient amount of the article has been pulled from the ground, the unit is released from the article. Preferably, the valve lever 144 is first shifted to retract the jack pads from the ground and thereafter the lever 142 is shifted to open the jaws. However, should the lever 142 be shifted first to open the jaws, the lever 144 will also be shifted because of the interlocking arm 146. In this manner opening and closing movements of the jaws while the jack pads are against the ground is prevented.

The foregoing series of steps in the operation of this device is illustrated in Figure 8 through 11.

It will be understood that the pump 98 which supplies the actuating fluid for the device may be driven in any suitable manner but it is preferably connected with the power takeoff of the tractor as indicated at 150 in Figure 2. The entire hydraulic power unit consisting of the reservoir 96, pump 98 and valve 102 are preferably constructed as an integral assembly and mounted on the tractor as shown in Figures 1 and 2.

It will be understood that this invention is susceptible to modification in order to adopt it to different usages and conditions and, accordingly, it is desired to comprehend such modifications within this invention as may fall within the scope of the appended claims.

We claim:

1. In a brush or stump puller; a frame having a vertical pivot at one end; a pair of jaws mounted on said pivot and movable for gripping brush or stumps therebetween, said jaws opening away from said frame; vertically actuated jack means carried at the jaw end of said frame; and power means also carried by the said frame at the jaw end thereof and connected with said jaws and with said jack means for actuating the same in their working movements, said jack means including ground pads directly beneath said jaws and being arranged and constructed to exert a separating thrust on said jaws and pads whereby the pulling force on an article is confined to said jaws and jack means and is not exerted on said frame.

2. In a brush or stump puller; a frame having means thereon adapted for being connected with a tractor frame; a pair of jaws pivoted for movement in a horizontal plane at one end of said frame and opening away from the frame; jack means positioned for vertical movements and carried by said frame at the jaw end thereof; and power means carried by said frame also at the jaw end thereof and selectively operable for actuating said jaws and said jack means, said jack means including arcuate ground pads movable with said jaws and of substantial circumferential extent to provide a large area for sustaining the thrust of said jack means and also to limit the amount of earth dislodged when the article being pulled is pulled from the ground by operation of the puller.

3. In a brush or stump puller; a frame; a pair of jaw means pivoted on a vertical axis at one end of said frame and movable in a horizontal plane for clamping articles to be pulled therebetween; and ground engaging jack means for urging said jaws upwardly to pull articles gripped thereby and comprising vertically movable members carried one on each jaw means and arranged to act downwardly through said jaw means to engage the ground therebeneath.

4. In a brush or stump puller; a frame; a pair of jaws pivoted for movements about a vertical axis at one end of said frame and opening away from said frame; cylinder means pivoted on the jaw end of said frame for movements about a vertical axis; fluid operable rams extending into said cylinders and having their ends pivoted to said jaws; vertically extending cylinders carried by said jaws and rams extending into said last mentioned cylinders and acting vertically downwardly for lifting the jaw end of said frame.

5. In a brush or stump puller; a frame; cooperating jaw means pivoted for movement about a vertical axis at one end of said frame and opening away from the frame; cylinder means pivoted on said frame adjacent the jaw end thereof for movements about a vertical axis; plunger means extending into said cylinder means and pivoted at one end to said jaw means; and jack means for elevating said jaw means thereby to pull articles gripped by said jaw means and comprising fluid operable rams carried by and acting through said jaw means.

6. In a brush or stump puller; a frame; cooperating jaw means pivoted for movement about a vertical axis at one end of said frame and opening away from the frame; cylinder means pivoted on said frame adjacent the jaw end thereof for movements about a vertical axis; plunger means extending into said cylinder means and pivoted at one end to said jaw means; and jack means for elevating said jaw means thereby to pull articles gripped by said jaw means and comprising fluid operable rams carried by and acting through said jaw means, said last mentioned ram means having ground engaging pads pivotally mounted at their lower ends.

7. In a brush or stump puller; a frame; a pair of jaws pivoted at one end of said frame for movement about a vertical axis for gripping brush or stumps therebetween; motor means carried by said frame at the jaw end thereof for actuating said jaws, said jaws comprising flat telescoping members having arcuate cut-outs along their adjacent inner surfaces; and beads extending around the said inner surfaces of said jaws for increasing their gripping power, each jaw comprising at least two vertically spaced flat members and said frame also including a plurality of flat members, all said members telescoping, and a pin vertically traversing said members and forming the pivot for said jaws.

8. In combination with a tractor having a chassis; a brush or stump puller having an open frame adapted for being mounted about the tractor chassis; jaw and jack means mounted at one end of said frame for gripping brush and stumps and for pulling them from the ground, said jaw means being pivoted on a vertical axis and opening away from said frame and said jack means being carried by said jaw means; pivot means between the ends of said frame for connecting the frame with the chassis of the tractor for pivoting movements of the frame thereon; a counter-weight carried by said frame at the end opposite said jaw and jack means, and a carrying latch engageable between the tractor chassis and said frame for supporting the frame in raised position for transport.

9. In combination; a tractor having a chassis; a frame comprising members extending longitudinally down each side of said chassis and being connected at the front and rear of said tractor; jaw and jack means carried by said frame at one end of said tractor for gripping articles therebetween and for pulling them from the ground; a counter-weight carried by said frame at the other end of said tractor; and resilient means pivotally supporting said members on said tractor chassis adjacent the front end thereof.

10. In a brush or stump puller; a frame having a vertical pivot at one end; a pair of jaw means mounted on said pivot for movement toward and away from each other for gripping brush and stumps therebetween and opening away from said frame; motor means carried by said frame for so actuating said jaws; and power operated jack means for moving said jaws upwardly when an article is gripped thereby and comprising vertically acting rams carried by said jaws and acting downwardly therethrough, said rams being substantially diametrically opposite each other across the gripping space between said jaws.

11. In a brush or stump puller; a frame; a vertical pivot at one end of said frame; a pair of telescoping jaw means mounted on said pivot and opening away from said frame; a motor for each jaw carried by said frame; jack means comprising vertically acting rams one carried directly by each jaw to act downwardly therethrough and positioned substantially diametrically opposite each other across the opening between said jaws; and ground engaging pad means movably carried on the lower ends of said rams beneath said jaws.

12. In a combination; in a brush or stump puller having a frame; a vertical pivot at one end of said frame; telescoping jaw means mounted on said pivot and opening away from said frame; a jack mounted directly on each of said jaws and including a downwardly acting ram extending through the associated jaw; ground engaging pads at the lower ends of said rams beneath said jaws; and swivel joints connecting said pads with said rams.

13. In a brush or stump puller; a frame; a pair of jaws pivoted for movements in a horizontal plane at one end of said frame; jack means carried by and acting through said jaw means for lifting the same when an article is gripped therebetween; motor means for actuating said jaw means; other motor means for actuating said jack means; and control means interlocking the operation of both said motor means whereby actuation of the motor means for said jaw means to open the same is accompanied by actuation of the motor means for said jack means to elevate the same.

14. In a brush or stump puller having a frame with jaw means pivoted at one end thereof for gripping brush, stumps, and the like; jacks carried by said jaws for forcing the same upwardly to pull articles gripped thereby from the ground; first fluid motor means for actuating said jaws; second fluid motor means for actuating said jacks; and control means for preventing at least the opening of said jaws while said jacks are actuated downwardly.

15. In a brush or stump puller; a frame having jaws pivoted for movement in a horizontal plane at one end thereof; a jack carried by each jaw and acting downwardly therethrough; a source of pressure fluid; a fluid motor for each jack and each jaw; a first valve connecting said source with the jaw motors; a second valve connecting said source with said jack motors; and means interlocking the movement of said valves for preventing the opening of said jaws when said jacks are actuated downwardly.

16. The method of pulling brush, stumps and the like from the ground which comprises; gripping the article to be pulled between a pair of jaw means; and urging the jaw means vertically upward to dislodge the member being pulled from the ground by a vertical thrust applied between each of said jaw means and the ground directly therebeneath.

17. The method of pulling brush, stumps and the like from the ground which comprises; gripping the article to be pulled between a pair of jaws, and dislodging the article from the ground by a vertical thrust applied between fixed predetermined points on the said jaw and the ground directly therebeneath.

18. In a brush or stump puller having a frame with jaw means pivoted at one end thereof for gripping brush, stumps, and the like; jacks carried by the jaw end of the frame for forcing the frame and jaws upwardly to pull articles gripped by the jaws from the ground; first motor means for actuating said jaws; second motor means for actuating said jacks; and control means for preventing at least the opening of said jaws while said jacks are actuated downwardly.

19. In a brush or stump puller having a frame; a pair of jaws pivoted at one end of said frame for movement about a vertical axis for gripping brush or stumps therebetween; each said jaw comprising at least two vertically spaced flat plate members and said frame also including a plurality of vertically spaced flat plate members, all of said plates telescoping together to form a continuous mass of metal in the direction of and about said axis, a pivot shaft traversing said members on said axis and forming the pivot for said jaws, and motor means connected between said jaws and frame for actuating said jaws toward and away from each other.

20. The method of pulling brush, stumps and the like from the ground which comprises; placing ground engaging means adjacent the ground and directly beneath a pair of gripping jaws, gripping the article to be pulled between said pair of jaws and dislodging the article from the ground by a vertical thrust applied between each of said jaws and the ground engaging means therebeneath.

WALTER ERNST.
DICK FRANKLIN BOYD.

REFERENCES CITED

The following references are of record in the file of this patent:

UNITED STATES PATENTS

| Number | Name | Date |
|---|---|---|
| 1,437,547 | Pope | Dec. 5, 1922 |
| 1,494,580 | Brandt | May 20, 1924 |
| 1,764,905 | Standfuss | June 17, 1930 |
| 1,884,861 | Remde | Oct. 25, 1932 |
| 1,906,532 | Buehler et al. | May 2, 1933 |
| 2,025,340 | Crocker | Dec. 24, 1935 |
| 2,189,052 | Anthony | Feb. 6, 1940 |
| 2,252,534 | Trotter | Aug. 12, 1941 |
| 2,332,561 | Drott | Oct. 26, 1943 |
| 2,436,510 | Ferguson | Feb. 24, 1948 |